J. GRACIE.
Improvement in Stills for Hydrocarbons.

No. 114,802.          Patented May 16, 1871.

Witnesses.
A. C. Johnston
Jas. G. Thompson

Inventor:
John Gracie By his
attorney James L. Johnston

UNITED STATES PATENT OFFICE.

JOHN GRACIE, OF PITTSBURG, PENNSYLVANIA, ASSIGNOR TO LOCKHART, FREW & CO., OF SAME PLACE.

IMPROVEMENT IN STILLS FOR HYDROCARBONS.

Specification forming part of Letters Patent No. 114,802, dated May 16, 1871.

*To all whom it may concern:*

Be it known that I, JOHN GRACIE, of Pittsburg, in the county of Allegheny and State of Pennsylvania, have invented a new and useful Improvement in Stills for Hydrocarbons; and I do hereby declare that the following is a full, clear, and exact description thereof, reference being had to the accompanying drawings, and to the letters of reference marked thereon.

The nature of my invention consists in surrounding a still for distilling hydrocarbons with an iron casing, (by preference lined with fire-brick,) so arranged with relation to the still as to form an air-chamber between it and the casing, and combining with said air-chamber an air-pump or its equivalent, the whole being for the purpose of regulating the temperature of the still during the process of distillation.

To enable others skilled in the art to make and use my invention, I will proceed to describe its construction and operation.

Figure 1:
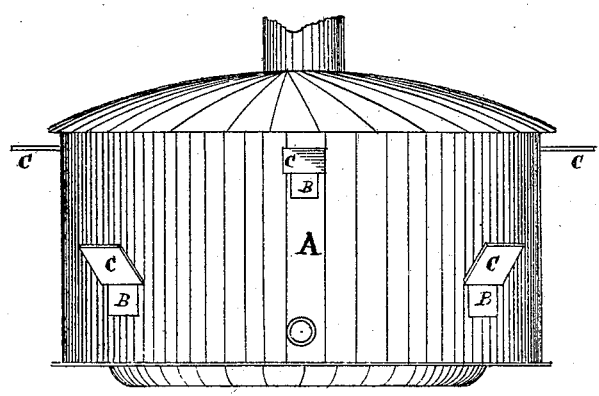
Figure 2:
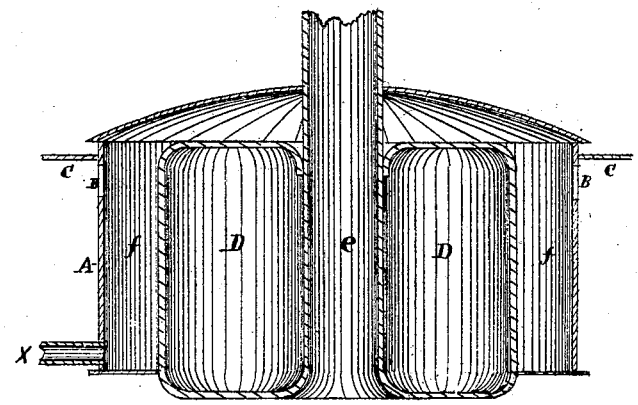
Figure 3:
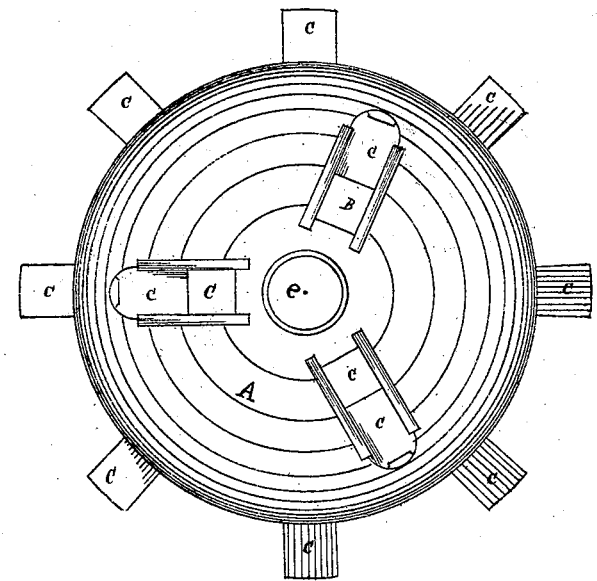

In the accompanying drawings, which form part of my specification, Figure 1 is a side elevation of my improvement in stills for distilling hydrocarbons. Fig. 2 is a vertical section of the same. Fig. 3 is a top view or plan of the same.

In the drawings, A represents the iron-casing, which surrounds the still D D and is provided with a series of openings, B, which may be closed with doors C. Near the lower edge of the casing is a pipe, X, to which may be attached an air-pump or other blast device for forcing cold air into the air-chamber $f$, and by that means regulate the temperature of the still during the process of distilling.

The still D D is of that class which has a flue, $e$, passing up through the center of it, and is heated by a series of fires, (such as described in the patent granted to Lockhart & Gracie, July 28, 1868.)

I have found by experience that by lining the casing A with fire-brick the temperature of the still will be more uniform than by using the casing without such lining, therefore I would recommend the case with fire-brick lining as being the most desirable.

I am aware that casings have been placed around stills, and that such casing has been provided with openings which were closed with doors, and that said casing was used for protecting the still from the action of the atmosphere upon it, and that the openings in the casing have been used for admitting air around the still for cooling off after distillation has been completed; but I have found by experience that such arrangement is insufficient for the purpose of regulating the temperature of large stills and therefore combined with such casing the action of an air-pump or its equivalent, so that an active current combined with a large quantity of air may be quickly thrown around the still when it has attained an undue temperature.

In the process of distilling hydrocarbon a uniform temperature of the still is important, and without it the product of distillation will be an oil of inferior quality, both in color and burning properties, and when stills of large capacity are used it is necessary to their perfect working to have some means for rapidly reducing their temperature when it rises above the desired degree, otherwise the refiner of hydrocarbon oil will be subjected to loss in price of his oil on account of color, and will also be subjected to an increased expense in the use of chemicals, labor, and loss of time, all of which are avoided by combining with the casing A an air-pump or its equivalent for forcing air into the chamber $f$.

The manner of using my improvement is as follows: When the temperature of the still rises above the degree desired, the doors C are opened up and air is forced through the pipe X into the air-chamber $f$ until the temperature of the still is reduced to the desired degree, the doors C are then gradually closed, so as not to again increase the temperature beyond the desired degree.

I wish it clearly understood that I do not claim, broadly, surrounding a still with an air-chamber. Neither do I claim such air-chamber with opening above and below leading to or from it, as described in J. Merrill's patent of July 30, 1861.

Having thus described the nature, construction, and operation of my improvement, what I claim as of my invention is—

Surrounding a still for hydrocarbon with an air-chamber and combining therewith an air-pump, as herein described.

JOHN GRACIE.

Witnesses:
  A. C. JOHNSTON,
  JAS. G. THOMPSON.